United States Patent
Liu et al.

(10) Patent No.: US 11,174,419 B2
(45) Date of Patent: Nov. 16, 2021

(54) LIGHT STABLE TRANSPARENT ADHESIVE COMPOSITIONS AND METHODS FOR USE THEREOF

(71) Applicants: Henkel IP & Holding GmbH, Duesseldorf (DE); Henkel AG & Co. KGaA, Duesseldorf (DE)

(72) Inventors: Puwei Liu, Glastonbury, CT (US); Jiangbo Ouyang, Wallingford, CT (US); ChunHua Gu, Shanghai (CN)

(*) Notice: Subject to any disclaimer, the term of this patent is extended or adjusted under 35 U.S.C. 154(b) by 360 days.

(21) Appl. No.: 16/287,093

(22) Filed: Feb. 27, 2019

(65) Prior Publication Data

US 2019/0218434 A1    Jul. 18, 2019

Related U.S. Application Data

(63) Continuation of application No. PCT/CN2016/097272, filed on Aug. 30, 2016.

(51) Int. Cl.
| | | |
|---|---|---|
| *C09J 133/14* | (2006.01) |
| *C09J 133/00* | (2006.01) |
| *C09J 133/04* | (2006.01) |
| *C09J 11/04* | (2006.01) |
| *C09J 133/06* | (2006.01) |
| *C09J 133/08* | (2006.01) |
| *C09J 163/00* | (2006.01) |
| *C09J 167/06* | (2006.01) |
| *C09J 183/04* | (2006.01) |
| *G02B 1/04* | (2006.01) |
| *C08F 220/30* | (2006.01) |
| *C08K 9/04* | (2006.01) |
| *C08K 3/22* | (2006.01) |
| *C08K 9/08* | (2006.01) |
| *C08K 9/10* | (2006.01) |
| *C09J 201/00* | (2006.01) |

(52) U.S. Cl.
CPC .......... *C09J 133/14* (2013.01); *C08F 220/30* (2013.01); *C08K 3/22* (2013.01); *C08K 9/04* (2013.01); *C09J 11/04* (2013.01); *C09J 133/00* (2013.01); *C09J 133/04* (2013.01); *C09J 201/00* (2013.01); *G02B 1/04* (2013.01); *C08F 220/301* (2020.02); *C08K 2003/2241* (2013.01); *C08K 2003/2244* (2013.01); *C08K 2201/005* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 5,717,034 A | 2/1998 | Dershem et al. | |
| 5,718,941 A | 2/1998 | Dershem et al. | |
| 6,387,981 B1 * | 5/2002 | Zhang | A61K 6/20 523/117 |
| 2005/0252414 A1 * | 11/2005 | Craig | A61K 6/30 106/35 |
| 2010/0256271 A1 * | 10/2010 | Hasegawa | C08F 2/44 524/204 |
| 2014/0058038 A1 | 2/2014 | Hunt et al. | |
| 2016/0113846 A1 * | 4/2016 | Willner | A61K 6/71 433/217.1 |

FOREIGN PATENT DOCUMENTS

| | | |
|---|---|---|
| EP | 1510557 | 3/2005 |
| EP | 2913355 | 9/2015 |
| JP | 2009120726 | 6/2009 |
| JP | 2012046673 | 3/2012 |
| JP | 2012062242 | 3/2012 |
| JP | 2012246455 | 12/2012 |
| JP | 2014516094 | 7/2014 |
| JP | 2014201735 | 10/2014 |
| KR | 20140141532 | 12/2014 |
| TW | 201544564 | 12/2015 |
| WO | 2013077219 | 2/2013 |

* cited by examiner

*Primary Examiner* — Sheeba Ahmed

(74) *Attorney, Agent, or Firm* — Steven C. Bauman

(57) ABSTRACT

Provided herein are high refractive index compositions with excellent light stability, and methods for the use thereof, as well as assemblies and articles prepared using invention formulations and methods.

15 Claims, No Drawings

LIGHT STABLE TRANSPARENT ADHESIVE COMPOSITIONS AND METHODS FOR USE THEREOF

FIELD OF THE INVENTION

The present invention relates to high refractive index compositions with excellent light stability, and methods for the use thereof. The present invention also relates to assemblies and articles prepared using invention formulations and methods.

BACKGROUND OF THE INVENTION

There are currently no commercially available high refractive index adhesive products with good optical properties, although there do exist several experimental samples that claim to have high refractive index value. Such materials have, however, been shown to have poor optical properties and light stability problems (poor QUV performance), which are extremely important properties for optical products for electronic applications.

These and other limitations of prior art formulations and methods are hereby addressed by the present invention.

SUMMARY OF THE INVENTION

In accordance with the present invention, there are provided high refractive index compositions with excellent light stability and good optical properties.

In accordance with certain aspects of the present invention, there are also provided assemblies and articles prepared using invention formulations and methods.

In accordance with the present invention, the limitations of the prior art have been overcome and the excellent performance of invention compositions, and methods for preparing and using same, have been demonstrated.

DETAILED DESCRIPTION OF THE INVENTION

In accordance with the present invention, there are provided stable, high refractive index, non-yellowing, optically transparent adhesive formulations comprising:
  one or more non-yellowing, light stable resin(s), wherein said resin is not derived from a sulfur-containing compound or a polyaromatic compound having substantial conjugation between the aromatic rings thereof, and
  nanoparticles having a refractive index in the range of 1.70 up to 4.50,
wherein:
  the resulting formulation has a refractive index in the range of about 1.55 up to about 2.0, and
  the resulting formulation passes the standard industrial QUV test for at least 500 hours without a significant increase in its yellow index value.

In some embodiments, the refractive index of the resulting formulation falls in the range of about 1.55 up to about 2.0. In some embodiments, the refractive index of the resulting formulation falls in the range of about 1.55 up to about 1.80. In some embodiments, the refractive index of the resulting formulation falls in the range of about 1.55 up to about 1.74.

In some embodiments, invention formulations comprise:
  in the range of about 5 up to about 98 wt % of said light stable resin and
  in the range of about 2 up to about 95 wt % of said nanoparticles having high refractive index.

In some embodiments, invention formulations comprise:
  in the range of about 10 up to about 50 wt % of said light stable resin and
  in the range of about 50 up to about 90 wt % of said nanoparticles having high refractive index.

In some embodiments (e.g., when the refractive index is about 1.55), invention formulations comprise:
  in the range of about 5 up to about 50 wt % of said light stable resin and
  in the range of about 2 up to about 40 wt % of said nanoparticles having high refractive index.

In some embodiments (e.g., when the refractive index is about 1.74), invention formulations comprise:
  in the range of about 5 up to about 30 wt % of said light stable resin and
  in the range of about 70 up to about 95 wt % of said nanoparticles having high refractive index.

Invention formulations are further defined as having a yellow index value, B*, of <1 and/or a thickness in the range of about 1 μm up to about 1000 μm and/or said formulation is at least 97% transparent.

In some embodiments, invention formulations have a yellow index value, B*, of <2; in some embodiments, invention formulations have a yellow index value, B*, of <3.

In some embodiments, invention formulations have a thickness in the range of about 10 μm up to about 1000 μm. In some embodiments, invention formulations have a thickness in the range of about 10 μm up to about 500 μm.

In some embodiments, invention formulations are at least 98% transparent; in some embodiments, invention formulations are at least 99% transparent; in some embodiments, invention formulations are at least 99.5% transparent.

Non-Yellowing, Light Stable Resin(s)

A wide variety of non-yellowing, light stable resin(s) are contemplated for use herein; exemplary non-yellowing, light stable resin(s) contemplated for use herein are derived from acrylates, methacrylates, epoxies, vinyl ethers, vinyl esters, cyanoacrylates, silicones, silicone-containing acrylates, silicone-containing vinyl ethers, one or more monomers that can be free-radically polymerized, as well as mixtures of any two or more thereof.

Non-yellowing light stable resins contemplated for use herein are typically not derived from unsaturated sulfur-containing compounds, which tend to yellow upon aging and/or exposure to light, moisture, heat and the like. Similarly, non-yellowing light stable resins contemplated for use herein are typically not derived from polyaromatic compounds having substantial conjugation between the aromatic rings thereof as such materials are also prone to yellowing upon aging and/or exposure to light, moisture, heat and the like.

Acrylates

Acrylates contemplated for use in the practice of the present invention are well known in the art. See, for example, U.S. Pat. No. 5,717,034, the entire contents of which are hereby incorporated by reference herein.

Exemplary acrylates contemplated for use herein include monofunctional (meth)acrylates, difunctional (meth)acrylates, trifunctional (meth)acrylates, polyfunctional (meth)acrylates, and the like.

Exemplary monofunctional (meth)acrylates include phenylphenol acrylate, methoxypolyethylene acrylate, acryloyloxyethyl succinate, fatty acid acrylate, methacryloyloxyethylphthalic acid, phenoxyethylene glycol methacrylate, fatty acid methacrylate, β-carboxyethyl acrylate, isobornyl acrylate, isobutyl acrylate, t-butyl acrylate, hydroxyethyl acrylate, hydroxypropyl acrylate, dihydrocyclopentadiethyl acrylate, cyclohexyl methacrylate, t-butyl methacrylate, dimethylaminoethyl methacrylate, diethylaminoethyl methacrylate, t-butylaminoethyl methacrylate, 4-hydroxybutyl acrylate, tetrahydrofurfuryl acrylate, benzyl acrylate, ethylcarbitol acrylate, phenoxyethyl acrylate, methoxytriethylene glycol acrylate, monopentaerythritol acrylate, dipentaerythritol acrylate, tripentaerythritol acrylate, polypentaerythritol acrylate, and the like.

Exemplary difunctional (meth)acrylates include hexanediol dimethacrylate, hydroxyacryloyloxypropyl methacrylate, hexanediol diacrylate, urethane acrylate, epoxyacrylate, bisphenol A-type epoxyacrylate, modified epoxyacrylate, fatty acid-modified epoxyacrylate, amine-modified bisphenol A-type epoxyacrylate, allyl methacrylate, ethylene glycol dimethacrylate, diethylene glycol dimethacrylate, ethoxylated bisphenol A dimethacrylate, tricyclodecanedimethanol dimethacrylate, glycerin dimethacrylate, polypropylene glycol diacrylate, propoxylated ethoxylated bisphenol A diacrylate, 9,9-bis(4-(2-acryloyloxyethoxy)phenyl)fluorene, tricyclodecane diacrylate, dipropylene glycol diacrylate, polypropylene glycol diacrylate, PO-modified neopentyl glycol diacrylate, tricyclodecanedimethanol diacrylate, 1,12-dodecanediol dimethacrylate, and the like.

Exemplary trifunctional (meth)acrylates include trimethylolpropane trimethacrylate, trimethylolpropane triacrylate, trimethylolpropane ethoxy triacrylate, polyether triacrylate, glycerin propoxy triacrylate, and the like.

Exemplary polyfunctional (meth)acrylates include dipentaerythritol polyacrylate, dipentaerythritol hexaacrylate, pentaerythritol tetraacrylate, pentaerythritolethoxy tetraacrylate, ditrimethylolpropane tetraacrylate, and the like.

Additional exemplary acrylates contemplated for use in the practice of the present invention include those described in U.S. Pat. No. 5,717,034, the entire contents of which are hereby incorporated by reference herein.

Additional exemplary acrylate resins contemplated for use herein are derived from an aliphatic acrylate such as:

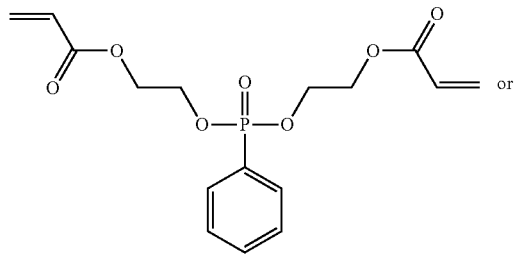

Di(acryloyloxyethyl) Benzenephosphonate (DABP)

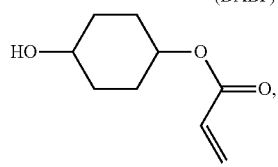

1,4-cyclohexanediol monoacrylate

Additional exemplary acrylate resins contemplated for use herein include acrylate resins derived from an aromatic acrylate that does not contain any fused/conjugated aromatic rings, or any aromatic rings directly linked with more than one carbonyl groups, e.g.:

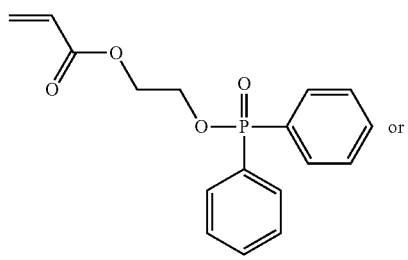

Acryloyloxyethyl Diphenylphosphinate (ADP)

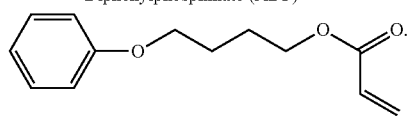

Phenoxybutyl acrylate

Still further exemplary acrylate resins contemplated for use herein include acrylate resins derived from compounds having non-fused/non-conjugated aromatic rings, e.g.:

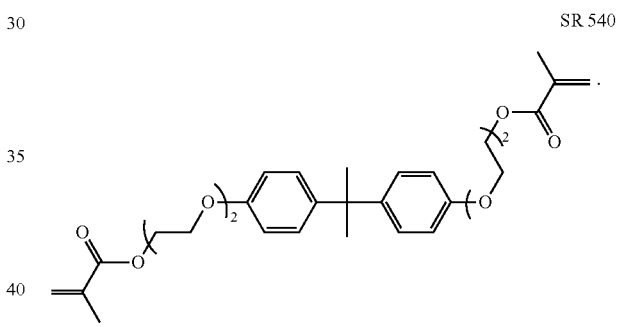

SR 540

Additional exemplary acrylate resins contemplated for use herein include acrylate resins derived from:

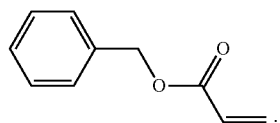

Benzyl acrylate (BZA)

Epoxies

A wide variety of epoxy-functionalized resins are contemplated for use herein, e.g., liquid-type epoxy resins based on bisphenol A, solid-type epoxy resins based on bisphenol A, liquid-type epoxy resins based on bisphenol F (e.g., Epiclon EXA-835LV), multifunctional epoxy resins based on phenol-novolac resin, dicyclopentadiene-type epoxy resins (e.g., Epiclon HP-7200L), naphthalene-type epoxy resins, and the like, as well as mixtures of any two or more thereof.

Exemplary epoxy-functionalized resins contemplated for use herein include the diepoxide of the cycloaliphatic alcohol, hydrogenated bisphenol A (commercially available as Epalloy 5000), a difunctional cycloaliphatic glycidyl ester of hexahydrophthallic anhydride (commercially available as Epalloy 5200), Epiclon EXA-835LV, Epiclon HP-7200L, and the like, as well as mixtures of any two or more thereof.

In certain embodiments, the epoxy component may include the combination of two or more different bisphenol based epoxies. These bisphenol based epoxies may be selected from bisphenol A, bisphenol F, or bisphenol S epoxies, or combinations thereof. In addition, two or more different bisphenol epoxies within the same type of resin (such A, F or S) may be used.

Commercially available examples of the bisphenol epoxies contemplated for use herein include bisphenol-F-type epoxies (such as RE-404-S from Nippon Kayaku, Japan, and EPICLON 830 (RE1801), 830S (RE1815), 830A (RE1826) and 830W from Dai Nippon Ink & Chemicals, Inc., and RSL 1738 and YL-983U from Resolution) and bisphenol-A-type epoxies (such as YL-979 and 980 from Resolution).

The bisphenol epoxies available commercially from Dai Nippon and noted above are promoted as liquid undiluted epichlorohydrin-bisphenol F epoxies having much lower viscosities than conventional epoxies based on bisphenol A epoxies and have physical properties similar to liquid bisphenol A epoxies. Bisphenol F epoxy has lower viscosity than bisphenol A epoxies, all else being the same between the two types of epoxies, which affords a lower viscosity and thus a fast flow underfill sealant material. The EEW of these four bisphenol F epoxies is between 165 and 180. The viscosity at 25° C. is between 3,000 and 4,500 cps (except for RE1801 whose upper viscosity limit is 4,000 cps). The hydrolyzable chloride content is reported as 200 ppm for RE1815 and 830W, and that for RE1826 as 100 ppm.

The bisphenol epoxies available commercially from Resolution and noted above are promoted as low chloride containing liquid epoxies. The bisphenol A epoxies have a EEW (g/eq) of between 180 and 195 and a viscosity at 25° C. of between 100 and 250 cps. The total chloride content for YL-979 is reported as between 500 and 700 ppm, and that for YL-980 as between 100 and 300 ppm. The bisphenol F epoxies have a EEW (g/eq) of between 165 and 180 and a viscosity at 25° C. of between 30 and 60. The total chloride content for RSL-1738 is reported as between 500 and 700 ppm, and that for YL-983U as between 150 and 350 ppm.

In addition to the bisphenol epoxies, other epoxy compounds are contemplated for use as the epoxy component of invention formulations. For instance, cycloaliphatic epoxies, such as 3,4-epoxycyclohexylmethyl-3,4-epoxycyclohexylcarbonate, can be used. Also monofunctional, difunctional or multifunctional reactive diluents may be used to adjust the viscosity and/or lower the Tg of the resulting resin material. Exemplary reactive diluents include butyl glycidyl ether, cresyl glycidyl ether, polyethylene glycol glycidyl ether, polypropylene glycol glycidyl ether, and the like.

Epoxies suitable for use herein include, polyglycidyl derivatives of phenolic compounds, such as those available commercially under the tradename EPON, such as EPON 828, EPON 1001, EPON 1009, and EPON 1031 from Resolution; DER 331, DER 332, DER 334, and DER 542 from Dow Chemical Co.; and BREN-S from Nippon Kayaku. Other suitable epoxies include polyepoxides prepared from polyols and the like and polyglycidyl derivatives of phenol-formaldehyde novolacs, the latter of such as DEN 431, DEN 438, and DEN 439 from Dow Chemical. Cresol analogs are also available commercially under the tradename ARALDITE, such as ARALDITE ECN 1235, ARALDITE ECN 1273, and ARALDITE ECN 1299 from Ciba Specialty Chemicals Corporation. SU-8 is a bisphenol-A-type epoxy novolac available from Resolution. Polyglycidyl adducts of amines, aminoalcohols and polycarboxylic acids are also useful in this invention, commercially available resins of which include GLYAMINE 135, GLYAMINE 125, and GLYAMINE 115 from F.I.C. Corporation; ARALDITE MY-720, ARALDITE 0500, and ARALDITE 0510 from Ciba Specialty Chemicals and PGA-X and PGA-C from the Sherwin-Williams Co.

Appropriate monofunctional epoxy coreactant diluents for optional use herein include those that have a viscosity which is lower than that of the epoxy component, ordinarily, less than about 250 cps.

The monofunctional epoxy coreactant diluents should have an epoxy group with an alkyl group of about 6 to about 28 carbon atoms, examples of which include $C_{6-28}$ alkyl glycidyl ethers, $C_{6-28}$ fatty acid glycidyl esters, $C_{6-28}$ alkylphenol glycidyl ethers, and the like.

In the event such a monofunctional epoxy coreactant diluent is included, such coreactant diluent should be employed in an amount from about 0.5 percent by weight to about 10 percent by weight, based on the total weight of the composition; in some embodiments, such coreactant diluent should be employed in an amount from about 0.25 percent by weight to about 5 percent by weight, based on the total weight of the composition.

The epoxy component should be present in the composition in an amount in the range of about 1 percent by weight to about 40 percent by weight; in some embodiments, invention formulations comprise about 2 percent by weight to about 18 percent by weight epoxy; in some embodiments, invention formulations comprise about 5 to about 15 percent by weight epoxy.

In some embodiments, the epoxy component employed herein is a silane modified epoxy, e.g., a composition of matter that includes:

(A) an epoxy component embraced by the following structure:

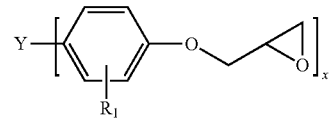

where:
Y may or may not be present and when Y present is a direct bond, $CH_2$, $CH(CH_3)_2$, C=O, or S,
$R_1$ here is alkyl, alkenyl, hydroxy, carboxy and halogen, and
x here is 1-4;
(B) an epoxy-functionalized alkoxy silane embraced by the following structure:

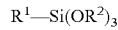

wherein
$R^1$ is an oxirane-containing moiety and
$R^2$ is an alkyl or alkoxy-substituted alkyl, aryl, or aralkyl group having from one to ten carbon atoms; and
(C) reaction products of components (A) and (B).

An example of one such silane-modified epoxy is formed as the reaction product of an aromatic epoxy, such as a bisphenol A, E, F or S epoxy or biphenyl epoxy, and epoxy silane where the epoxy silane is embraced by the following structure:

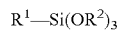

wherein
R[1] is an oxirane-containing moiety, examples of which include 2-(ethoxymethyl)oxirane, 2-(propoxymethyl)oxirane, 2-(methoxymethyl)oxirane, and 2-(3-methoxypropyl)oxirane and R[2] is an alkyl or alkoxy-substituted alkyl, aryl, or aralkyl group having from one to ten carbon atoms.

In one embodiment, R[1] is 2-(ethoxymethyl)oxirane and R[2] is methyl.

Idealized structures of the aromatic epoxy used to prepare the silane modified epoxy include

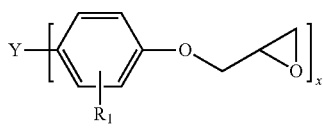

wherein
Y may or may not be present, and when Y is present, it is a direct bond, $CH_2$, $CH(CH_3)_2$, $C=O$, or S, $R_1$ is alkyl, alkenyl, hydroxy, carboxy or halogen, and x is 1-4.

Of course, when x is 2-4, chain extended versions of the aromatic epoxy are also contemplated as being embraced by this structure.

For instance, a chain extended version of the aromatic epoxy may be embraced by the structure below

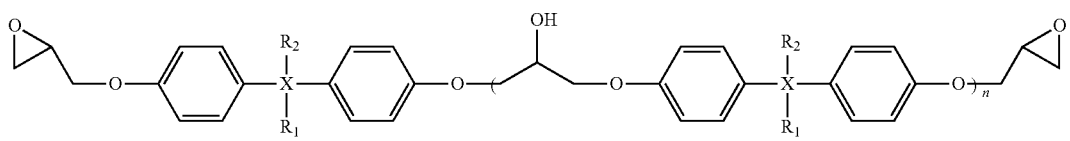

In some embodiments, the siloxane modified epoxy resin has the structure:

—(O—Si(Me)$_2$—O—Si(Me)(Z)—O—Si(Me)$_2$—O—Si(Me)$_2$)$_n$— wherein:
Z is —O—(CH$_2$)$_3$—O-Ph-CH$_2$-Ph-O—(CH$_2$—CH(OH)—CH$_2$—O-Ph-CH$_2$-Ph-O—)$_n$—CH$_2$-oxirane, and n falls in the range of about 1-4.

In some embodiments, the siloxane modified epoxy resin is produced by contacting a combination of the following components under conditions suitable to promote the reaction thereof:

Me$_2$Si(OMe)$_2$

+

(MeO)$_3$Si—(CH$_2$)$_3$—O—CH$_2$-oxirane

+ oxirane-CH$_2$—O—Ph—CH$_2$—Ph—O—(CH$_2$—CH(OH)—CH$_2$—O—Ph—CH$_2$—Ph—O)$_n$—CH$_2$-oxirane, wherein "n" falls in the range of about 1-4.

The silane modified epoxy may also be a combination of the aromatic epoxy, the epoxy silane, and reaction products of the aromatic epoxy and the epoxy silane. The reaction products may be prepared from the aromatic epoxy and epoxy silane in a weight ratio of 1:100 to 100:1, such as a weight ratio of 1:10 to 10:1.

Quantities of epoxy monomer(s) contemplated for use in invention compositions are sufficient so that the resulting formulation comprises in the range of about 1-20 wt % of said epoxy. In certain embodiments, the resulting formulation comprises in the range of about 2-18 wt % of said epoxy. In certain embodiments, the resulting formulation comprises in the range of about 5-15 wt % of said epoxy.

Epoxy cure agents are optionally employed in combination with epoxy monomer(s). Exemplary epoxy cure agents include ureas, aliphatic and aromatic amines, amine hardeners, polyamides, imidazoles, dicyandiamides, hydrazides, urea-amine hybrid curing systems, free radical initiators (e.g., peroxy esters, peroxy carbonates, hydroperoxides, alkylperoxides, arylperoxides, azo compounds, and the like), organic bases, transition metal catalysts, phenols, acid anhydrides, Lewis acids, Lewis bases, and the like.

When epoxy cure agents are present, invention compositions comprise in the range of about 0.1-2 wt % thereof. In certain embodiments, invention compositions comprise in the range of about 0.5-5 wt % of epoxy cure agent.

Maleimides, Nadimides or Itaconimides

Maleimides, nadimides or itaconimides contemplated for use herein are compounds having the structure:

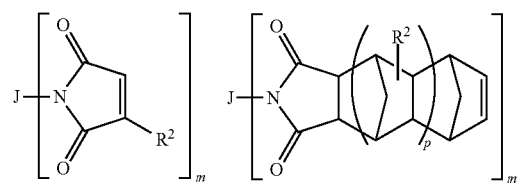

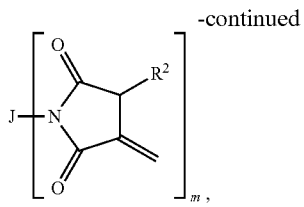

respectively,
wherein:
  m is 1-15,
  p is 0-15,
  each $R^2$ is independently selected from hydrogen or lower alkyl (such as $C_{1-5}$), and
  J is a monovalent or a polyvalent radical comprising organic or organosiloxane radicals, and combinations of two or more thereof.

In some embodiments of the present invention, J is a monovalent or polyvalent radical selected from:
  hydrocarbyl or substituted hydrocarbyl species typically having in the range of about 6 up to about 500 carbon atoms, where the hydrocarbyl species is selected from alkyl, alkenyl, alkynyl, cycloalkyl, cycloalkenyl, aryl, alkylaryl, arylalkyl, aryalkenyl, alkenylaryl, arylalkynyl or alkynylaryl, provided, however, that X can be aryl only when X comprises a combination of two or more different species;
  hydrocarbylene or substituted hydrocarbylene species typically having in the range of about 6 up to about 500 carbon atoms, where the hydrocarbylene species are selected from alkylene, alkenylene, alkynylene, cycloalkylene, cycloalkenylene, arylene, alkylarylene, arylalkylene, arylalkenylene, alkenylarylene, arylalkynylene or alkynylarylene,
  heterocyclic or substituted heterocyclic species typically having in the range of about 6 up to about 500 carbon atoms,
  polysiloxane, or
  polysiloxane-polyurethane block copolymers, as well as combinations of one or more of the above with a linker selected from covalent bond, —O—, —S—, —NR—, —NR—C(O)—, —NR—C(O)—O—, —NR—C(O)—NR—, —S—C(O)—, —S—C(O)—O—, —S—C(O)—NR—, —O—S(O)$_2$—, —O—S(O)$_2$—O—, —O—S(O)$_2$—NR—, —O—S(O)—, —O—S(O)—O—, —O—S(O)—NR—, —O—NR—C(O)—, —O—NR—C(O)—O—, —O—NR—C(O)—NR—, —NR—O—C(O)—, —NR—O—C(O)—O—, —NR—O—C(O)—NR—, —O—NR—C(S)—, —O—NR—C(S)—O—, —O—NR—C(S)—NR—, —NR—O—C(S)—, —NR—O—C(S)—O—, —NR—O—C(S)—NR—, —O—C(S)—, —O—C(S)—O—, —O—C(S)—NR—, —NR—C(S)—, —NR—C(S)—O—, —NR—C(S)—NR—, —S—S(O)$_2$—, —S—S(O)$_2$—O—, —S—S(O)$_2$—NR—, —NR—O—S(O)—, —NR—O—S(O)—O—, —NR—O—S(O)—NR—, —NR—O—S(O)$_2$—, —NR—O—S(O)$_2$—O—, —NR—O—S(O)$_2$—NR—, —O—NR—S(O)—, —O—NR—S(O)—O—, —O—NR—S(O)—NR—, —O—NR—S(O)$_2$—O—, —O—NR—S(O)$_2$—NR—, —O—NR—S(O)$_2$—, —O—P(O)R$_2$—, —S—P(O)R$_2$—, or —NR—P(O)R$_2$—; where each R is independently hydrogen, alkyl or substituted alkyl.

Exemplary compositions include those wherein J is oxyalkyl, thioalkyl, aminoalkyl, carboxyalkyl, oxyalkenyl, thioalkenyl, aminoalkenyl, carboxyalkenyl, oxyalkynyl, thioalkynyl, aminoalkynyl, carboxyalkynyl, oxycycloalkyl, thiocycloalkyl, aminocycloalkyl, carboxycycloalkyl, oxycloalkenyl, thiocycloalkenyl, aminocycloalkenyl, carboxycycloalkenyl, heterocyclic, oxyheterocyclic, thioheterocyclic, aminoheterocyclic, carboxyheterocyclic, oxyaryl, thioaryl, aminoaryl, carboxyaryl, heteroaryl, oxyheteroaryl, thioheteroaryl, aminoheteroaryl, carboxyheteroaryl, oxyalkylaryl, thioalkylaryl, aminoalkylaryl, carboxyalkylaryl, oxyarylalkyl, thioarylalkyl, aminoarylalkyl, carboxyarylalkyl, oxyarylalkenyl, thioarylalkenyl, aminoarylalkenyl, carboxyarylalkenyl, oxyalkenylaryl, thioalkenylaryl, aminoalkenylaryl, carboxyalkenylaryl, oxyarylalkynyl, thioarylalkynyl, aminoarylalkynyl, carboxyarylalkynyl, oxyalkynylaryl, thioalkynylaryl, aminoalkynylaryl or carboxyalkynylaryl, oxyalkylene, thioalkylene, aminoalkylene, carboxyalkylene, oxyalkenylene, thioalkenylene, aminoalkenylene, carboxyalkenylene, oxyalkynylene, thioalkynylene, aminoalkynylene, carboxyalkynylene, oxycycloalkylene, thiocycloalkylene, aminocycloalkylene, carboxycycloalkylene, oxycycloalkenylene, thiocycloalkenylene, aminocycloalkenylene, carboxycycloalkenylene, oxyarylene, thioarylene, aminoarylene, carboxyarylene, oxyalkylarylene, thioalkylarylene, aminoalkylarylene, carboxyalkylarylene, oxyarylalkylene, thioarylalkylene, aminoarylalkylene, carboxyarylalkylene, oxyarylalkenylene, thioarylalkenylene, aminoarylalkenylene, carboxyarylalkenylene, oxyalkenylarylene, thioalkenylarylene, aminoalkenylarylene, carboxyalkenylarylene, oxyarylalkynylene, thioarylalkynylene, aminoarylalkynylene, carboxy arylalkynylene, oxyalkynylarylene, thioalkynylarylene, aminoalkynylarylene, carboxyalkynylarylene, heteroarylene, oxyheteroarylene, thioheteroarylene, aminoheteroarylene, carboxyheteroarylene, heteroatom-containing di- or polyvalent cyclic moiety, oxyheteroatom-containing di- or polyvalent cyclic moiety, thioheteroatom-containing di- or polyvalent cyclic moiety, aminoheteroatom-containing di- or polyvalent cyclic moiety, or a carboxyheteroatom-containing di- or polyvalent cyclic moiety.

Cyanate Ester-Based Resins

Cyanate ester monomers contemplated for use in the practice of the present invention contain two or more ring forming cyanate (—O—C≡N) groups which cyclotrimerize to form substituted triazine rings upon heating. Because no leaving groups or volatile byproducts are formed during curing of the cyanate ester monomer, the curing reaction is referred to as addition polymerization. Suitable polycyanate ester monomers that may be used in the practice of the present invention include, for example, 1,1-bis(4-cyanatophenyl)methane, 1,1-bis(4-cyanatophenyl)ethane, 2,2-bis(4-cyanatophenyl)propane, bis(4-cyanatophenyl)-2,2-butane, 1,3-bis[2-(4-cyanato phenyl)propyl]benzene, bis(4-cyanatophenyl)ether, 4,4'-dicyanatodiphenyl, bis(4-cyanato-3,5-dimethylphenyl)methane, tris(4-cyanatophenyl)ethane, cyanated novolak, 1,3-bis[4-cyanatophenyl-1-(1-methylethylidene)]benzene, cyanated phenoldicyclopentadiene adduct, and the like. Polycyanate ester monomers utilized in accordance with the present invention may be readily prepared by reacting appropriate dihydric or polyhydric phenols with a cyanogen halide in the presence of an acid acceptor.

Monomers that can optionally be combined with polycyanate ester monomer(s) in accordance with the present invention are selected from those monomers which undergo addition polymerization. Such monomers include vinyl ethers, divinyl ethers, diallyl ethers, dimethacrylates, dipropargyl ethers, mixed propargyl allyl ethers, monomaleimides, bismaleimides, and the like. Examples of such monomers include cyclohexanedimethanol monovinyl ether, trisallylcyanurate, 1,1-bis(4-allyloxyphenyl)ethane, 1,1-bis (4-propargyloxyphenyl)ethane, 1,1-bis(4-allyloxyphenyl-4'-propargyloxyphenyl)ethane, 3-(2,2-dimethyltrimethylene acetal)-1-maleimidobenzene, 2,2,4-trimethylhexamethylene-1,6-bismaleimide, 2,2-bis[4-(4-maleimidophenoxy)phenyl]propane, and the like.

Additional cyanate esters contemplated for use in the practice of the present invention are well known in the art. See, for example, U.S. Pat. No. 5,718,941, the entire contents of which are hereby incorporated by reference herein.

Silicones

Silicones contemplated for use in the practice of the present invention are well known in the art. See, for example, U.S. Pat. No. 5,717,034, the entire contents of which are hereby incorporated by reference herein.

Oxetanes

Oxetanes (i.e., 1,3-propylene oxides) are heterocyclic organic compounds with the molecular formula $C_3H_6O$, having a four-membered ring with three carbon atoms and one oxygen atom. The term oxetane also refers generally to any organic compound containing an oxetane ring. See, for example, Burkhard et al., in Angew. Chem. Int. Ed. 2010, 49, 9052-9067, the entire contents of which are hereby incorporated by reference herein.

Polyester-Based Resins

Polyesters contemplated for use in the practice of the present invention refer to condensation polymers formed by the reaction of polyols (also known as polyhydric alcohols), with saturated or unsaturated dibasic acids. Typical polyols used are glycols such as ethylene glycol; acids commonly used are phthalic acid and maleic acid. Water, a by-product of esterification reactions, is continuously removed, driving the reaction to completion. The use of unsaturated polyesters and additives such as styrene lowers the viscosity of the resin. The initially liquid resin is converted to a solid by cross-linking chains. This is done by creating free radicals at unsaturated bonds, which propagate to other unsaturated bonds in adjacent molecules in a chain reaction, linking the adjacent chains in the process.

Polyurethane-Based Resins

Polyurethanes contemplated for use in the practice of the present invention refer to polymers composed of a chain of organic units joined by carbamate (urethane) links. Polyurethane polymers are formed by reacting an isocyanate with a polyol. Both the isocyanates and polyols used to make polyurethanes contain on average two or more functional groups per molecule.

Polyimide-Based Resins

Polyimides contemplated for use in the practice of the present invention refer to polymers composed of a chain of organic units joined by imide linkages (i.e., —C(O)—N(R)—C(O)—). Polyimide polymers can be formed by a variety of reactions, i.e., by reacting a dianhydride and a diamine, by the reaction between a dianhydride and a diisocyanate, and the like.

Melamine-Based Resins

Melamines contemplated for use in the practice of the present invention refer to hard, thermosetting plastic materials made from melamine (i.e., 1,3,5-triazine-2,4,6-triamine) and formaldehyde by polymerization. In its butylated form, it can be dissolved in n-butanol and/or xylene. It can be used to cross-link with other resins such as alkyd, epoxy, acrylic, and polyester resins.

Urea-Formaldehyde-Based Resins

Urea-formaldehydes contemplated for use in the practice of the present invention refers to a non-transparent thermosetting resin or plastic made from urea and formaldehyde heated in the presence of a mild base such as ammonia or pyridine.

Exemplary thermoplastic resins contemplated for use herein include polyesters, polyacrylates (e.g., poly(methacrylate), poly(butyl methacrylate), polyurethanes, phenoxies, polyethyloxyazoline, polyvinyl pyrrolidone, polyvinyl alcohol, polyacrylamide, polyglycol, and polyacrylic acid; poly(ethylene glycol), an aromatic vinyl polymer, flexible epoxy, polymer with epoxy functional groups, polycarbonate, ABS, PC/ABS alloys, nylon, inherently conductive polymer, silicone polymer, siloxane polymer, rubbers, polyolefins, vinyls polymer, polyamides, fluoropolymers, polyphenylene ethers, co-polyestercarbonates, acrylonitrile butadiene styrene copolymers, polyarylate ether sulfones or ketones, polyamide imides, polyetherimides, poly(ethylene terephthalate), poly(1,4-butylene terephthalate), polyethylenes, polypropylenes, polypropylene-EPDM blends, butadienes, styrene-butadienes, nitriles, chlorosulfonates, neoprenes, acrylonitrile butadiene styrene copolymers, polyetheresters, styrene/acrylonitrile polymer, polyphenylene sulfide, nitrile rubbers, cellulose resin, and the like, as well as mixtures of any two or more thereof.

Optional Additives

In accordance with some embodiments of the present invention, the compositions described herein may further comprise one or more flow additives, adhesion promoters, rheology modifiers, toughening agents, film flexibilizers, UV stabilizers, epoxy-curing catalysts (e.g., imidazole), curing agents (e.g., dicumyl peroxide), and the like, as well as mixtures of any two or more thereof.

As used herein, the term "flow additives" refers to compounds which modify the viscosity of the formulation to which they are introduced. Exemplary compounds which impart such properties include silicon polymers, ethyl acrylate/2-ethylhexyl acrylate copolymers, alkylol ammonium salts of phosphoric acid esters of ketoxime, and the like, as well as combinations of any two or more thereof.

As used herein, the term "adhesion promoters" refers to compounds which enhance the adhesive properties of the formulation to which they are introduced.

As used herein, the term "rheology modifiers" refers to additives which modify one or more physical properties of the formulation to which they are introduced.

As used herein, the term "toughening agents" refers to additives which enhance the impact resistance of the formulation to which they are introduced.

As used herein, the term "UV stabilizers" refers to additives which can inhibit or absorb the harmful UV radiation that causes degradation of polymers. There are two primary types of stabilizers commonly used today: UV absorbers and Hindered Amine Light Stabilizers (HALS).

UV absorbers work by absorbing the UV rays and dissipating them into thermal energy. UV absorber chemistries include benzophenones, benzotriazoles, hydroxyphenyl triazines, and the like.

HALS work by scavenging free radical intermediates generated by the UV rays to neutralize the degradation. In both cases, the damaging effect of UV light is directed away from the base polymer and colorants due to interaction with the UV additive present in the base polymer.

As used herein, the term "film flexibilizers" refers to agents which impart flexibility to the films prepared from formulations containing same.

As used herein, the term "phenol-novolac hardeners" refers to materials which participate in the further interaction of reactive groups so as to increase the cross-linking thereof-thereby enhancing the stiffness thereof.

As used herein, the term "epoxy-curing catalysts" refers to reactive agents which promote oligomerization and/or polymerization of epoxy-containing moieties, e.g., imidazole.

As used herein, the term "curing agents" refers to reactive agents such as dicumyl peroxide which promote the curing of monomeric, oligomeric or polymeric materials.

Nanoparticles

Nanoparticles contemplated for use herein include $ZrO_2$, $TiO_2$, $Al_2O_3$, $Sb_2O_4$ (or $Sb_2O_3Sb_2O_5$), CdO, $CaO_2$, $Cu_2O$, FeO, $Fe_2O_3$, PbO, $MnOMnO_3$, $SnO_2$, ZnO, ZnS, ZnSe, ZnTe, and the like, or mixtures of any two or more thereof. Typically said nanoparticles have an average particle size of less than 40 nm; in some embodiments, said nanoparticles have an average particle size of less than 25 nm; in some embodiments, said nanoparticles have an average particle size in the range of 4-10 nm.

In some embodiments, the nanoparticles are stabilized metal oxide nanoparticles. When stabilized, the nanoparticles are stabilized by the presence of one or more surface active agents, e.g., capping agents (which serve to stop growth of nanoparticles and stabilize them from aggregation). Exemplary capping agents include polyvinyl alcohol, poly(N-vinyl-2-pyrrolidone), gum arabic, α-methacrylic acid, 11-mercaptoundecanoic acid or the disulfide derivative thereof, citric acid, trisodium citrate, stearic acid, palmitic acid, octanoic acid, decanoic acid, polyethylene glycol and derivatives thereof, polyacrylic acid and amino modified polyacrylic acid, 2-mercaptoethanol, starch, and the like, as well as mixtures of any two or more thereof.

The amount of capping agent contemplated to stabilize said nanoparticles falls in the range of about 1 up to about 40 weight percent of the composition; in some embodiments, the amount of capping agent employed falls in the range of about 1 up to about 30 weight percent of the composition; in some embodiments, the amount of capping agent employed falls in the range of about 1 up to about 20 weight percent of the composition; in some embodiments, the amount of capping agent employed falls in the range of about 1 up to about 10 weight percent of the composition; in some embodiments, the amount of capping agent employed falls in the range of about 1 up to about 5 weight percent of the composition; in some embodiments, the amount of capping agent employed falls in the range of about 2 up to about 40 weight percent of the composition; in some embodiments, the amount of capping agent employed falls in the range of about 2 up to about 30 weight percent of the composition; in some embodiments, the amount of capping agent employed falls in the range of about 2 up to about 20 weight percent of the composition; in some embodiments, the amount of capping agent employed falls in the range of about 2 up to about 10 weight percent of the composition; in some embodiments, the amount of capping agent employed falls in the range of about 2 up to about 5 weight percent of the composition; in some embodiments, the amount of capping agent employed falls in the range of about 3 up to about 40 weight percent of the composition; in some embodiments, the amount of capping agent employed falls in the range of about 3 up to about 30 weight percent of the composition; in some embodiments, the amount of capping agent employed falls in the range of about 3 up to about 20 weight percent of the composition; in some embodiments, the amount of capping agent employed falls in the range of about 3 up to about 10 weight percent of the composition; in some embodiments, the amount of capping agent employed falls in the range of about 3 up to about 5 weight percent of the composition; in some embodiments, the amount of capping agent employed falls in the range of about 4 up to about 40 weight percent of the composition; in some embodiments, the amount of capping agent employed falls in the range of about 4 up to about 30 weight percent of the composition; in some embodiments, the amount of capping agent employed falls in the range of about 4 up to about 20 weight percent of the composition; in some embodiments, the amount of capping agent employed falls in the range of about 4 up to about 10 weight percent of the composition; in some embodiments, the amount of capping agent employed falls in the range of about 4 up to about 5 weight percent of the composition.

Diluent

While not required for the practice of certain embodiments of the present invention, non-reactive organic diluent may optionally be employed, e.g., to facilitate handling of invention formulations as a result, for example, of lower viscosity, improved dispensability, and the like.

When present, exemplary organic diluents are selected from the group consisting of aromatic hydrocarbons (e.g., benzene, toluene, xylene, and the like), saturated hydrocarbons (e.g., hexane, cyclohexane, heptane, tetradecane), chlorinated hydrocarbons (e.g., methylene chloride, chloroform, carbon tetrachloride, dichloroethane, trichloroethylene, and the like), ethers (e.g., diethyl ether, tetrahydrofuran, dioxane, glycol ethers, monoalkyl or dialkyl ethers of ethylene glycol, and the like), polyols (e.g., polyethylene glycol, propylene glycol, polypropylene glycol, and the like), esters (e.g., ethyl acetate, butyl acetate, methoxy propyl acetate, and the like); dibasic esters (e.g., DBE-9), alpha-terpineol, beta-terpineol, kerosene, dibutylphthalate, butyl carbitol, butyl carbitol acetate, carbitol acetate, ethyl carbitol acetate, hexylene glycol, high boiling alcohols and esters thereof, glycol ethers, ketones (e.g., acetone, methyl ethyl ketone, and the like), amides (e.g., dimethylformamide, dimethylacetamide, and the like), heteroaromatic compounds (e.g., N-methylpyrrolidone, and the like), and the like, as well as mixtures of any two or more thereof.

Articles/Assemblies

In accordance with another aspect of the present invention, there are provided articles/assemblies comprising a first transparent component and a second transparent component separated only by an aliquot of a formulation according to the present invention and/or a cured aliquot of such a formulation.

The aliquot of invention formulation can be applied to said first and/or second transparent component at a thickness of about 1 μm up to about 1000 m.

Suitable substrates contemplated for use herein include polyethylene terephthalates, polymethyl methacrylates, polyethylenes, polypropylenes, polycarbonates, epoxy resins, polyimides, polyamides, polyesters, glass, Si die with silicon nitride passivation, Si die with polyimide passivation, BT substrates, bare Si, SR4 substrates, SR5 substrates, and the like.

As readily recognized by those of skill in the art, adhesion between invention formulations and a substrate therefor can be determined in a variety of ways, e.g., by ASTM standard cross-cut tape test pursuant to test method D 3359-97. Typically, the adhesion between the formulation and the substrate is at least level 1B, as determined by ASTM standard cross-cut tape test pursuant to test method D 3359-97. In some embodiments, adhesion comparable to at least ASTM level 1B is observed (i.e., at least 35% of the originally adhered film surface remains attached to the substrate after being subjected to the tape test). In certain embodiments of the present invention, adhesion comparable to at least ASTM level 2B is observed (i.e., at least 65% of the originally adhered formulation remains attached to the substrate after being subjected to the tape test). In certain embodiments of the present invention, adhesion comparable to at least ASTM level 3B is observed (i.e., at least 85% of the originally adhered formulation remains attached to the substrate after being subjected to the tape test). In certain embodiments of the present invention, adhesion comparable to at least ASTM level 4B is observed (i.e., at least 95% of the originally adhered formulation remains attached to the substrate after being subjected to the tape test). In certain embodiments of the present invention, adhesion comparable to at least ASTM level 5B is observed (i.e., 100% of the originally adhered formulation remains attached to the substrate after being subjected to the tape test).

In accordance with still another aspect of the present invention, there are provided light emitting elements wherein at least a light transmitting portion thereof is adhered thereto with a cured aliquot of a formulation according to the present invention.

Various aspects of the present invention are illustrated by the following non-limiting examples. The examples are for illustrative purposes and are not a limitation on any practice of the present invention. It will be understood that variations and modifications can be made without departing from the spirit and scope of the invention. One of ordinary skill in the art. readily knows how to synthesize or commercially obtain the reagents and components described herein.

Example 1

An exemplary formulation according to the present invention is prepared by combining the following components:

| Ingredients | Composition |
| --- | --- |
| Phenoxy butyl acrylate | 45.00% |
| SR 348 | 4.00% |
| Irgacure 184 | 1.00% |
| Nippon Shokubai 153-A | 50.00% |
| total | 100.00% |

Various performance properties were evaluated for the resulting formulation, as summarized in the following table:

| Property | Initial | 1000 hour QUV aging |
| --- | --- | --- |
| Transparency | 98.90% | 98.70% |
| Yellow index | 94.00% | 99.00% |
| Haze | 40.00% | 40.00% |
| RI (589 nm) | 1.61 | 1.61 |

Review of the preceding table reveals that an exemplary formulation according to the present invention has excellent transparency and refractive index; and these desirable properties are substantially maintained even upon exposure to 1000 hours of QUV aging.

Example 2

Another exemplary formulation according to the present invention is prepared by combining the following components:

| Ingredients | Composition |
| --- | --- |
| Phenoxy butyl acrylate | 11.00% |
| Benzyl methacrylate | 3.00% |
| 1,4-cyclohexanedimethanol monoacrylate | 6.90% |
| Irgacure 184 | 0.10% |
| Pixalclear PCPB | 80.00% |
| total | 100.00% |

Various performance properties were evaluated for the resulting formulation, as summarized in the following table:

| Property | Initial | 500 hour QUV aging |
| --- | --- | --- |
| Transparency | 99.00% | 98.89% |
| Yellow index | 0.72 | 0.84 |
| Haze | 0.20 | 0.20 |
| RI (589 nm) | 1.67 | 1.67 |

Review of the preceding table reveals that an exemplary formulation according to the present invention has excellent transparency and refractive index; and these desirable properties are substantially maintained even upon exposure to 500 hours of QUV aging.

Example 3

Yet another exemplary formulation according to the present invention is prepared by combining the following components:

| Ingredients | Composition |
| --- | --- |
| Phenoxy butyl acrylate | 11.00% |
| Benzyl methacrylate | 3.00% |
| 1,4-cyclohexanedimethanol monoacrylate | 5.90% |
| Irgacure 184 | 0.10% |
| Pixalclear PCPA | 80.00% |
| total | 100.00% |

Various performance properties were evaluated for the resulting formulation, as summarized in the following table:

| Property | Initial | 500 hour QUV aging |
| --- | --- | --- |
| Transparency | 99.00% | 98.89% |
| Yellow index | 0.72 | 0.84 |
| Haze | 0.20 | 0.20 |
| RI (589 nm) | 1.67 | 1.67 |

Review of the preceding table reveals that an exemplary formulation according to the present invention has excellent transparency and refractive index; and these desirable properties are substantially maintained even upon exposure to 500 hours of QUV aging.

Example 4

An comparative formulation based on a highly aromatic resin is prepared by combining the following components:

| Ingredients | Composition |
| --- | --- |
| Benzyl acrylate | 12.50% |
| 2-phenyl phenoxyethyl acrylate | 24.50% |
| SR348 | 12.90% |
| Irgacure 184 | 0.10% |
| Nippon Shokubai 158-A | 50.00% |
| total | 100.00% |

Various performance properties were evaluated for the resulting formulation, as summarized in the following table:

| Property | Initial | 500 hour QUV aging |
| --- | --- | --- |
| Transparency | 98.10% | 89.25% |
| Yellow index | 1.02 | 7.89 |
| Haze | 0.40 | 0.78 |
| RI (589 nm) | 1.6 | 1.6 |

Review of the preceding table reveals that the transparency and yellow index of a formulation based on the highly aromatic resin, 2-phenyl phenoxyethyl acrylate, do not fare well upon exposure to 500 hours of QUV aging.

Various modifications of the present invention, in addition to those shown and described herein, will be apparent to those skilled in the art of the above description. Such modifications are also intended to fall within the scope of the appended claims.

Patents and publications mentioned in the specification are indicative of the levels of those skilled in the art to which the invention pertains. These patents and publications are incorporated herein by reference to the same extent as if each individual application or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

That which is claimed is:

1. A stable, high refractive index, non-yellowing, optically transparent adhesive formulation comprising:

phenoxy butyl acrylate and one or more of 1,4-cyclohexanediol monoacrylate, benzyl methacrylate or

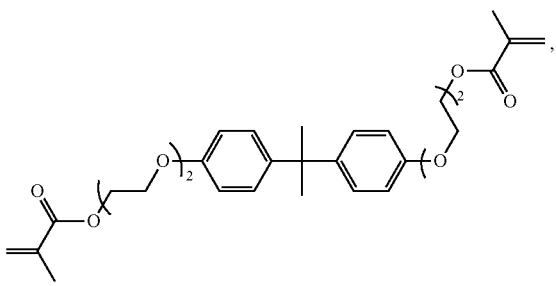

and $ZrO_2$ nanoparticles having a refractive index in the range of 1.70 up to 4.50, wherein:

the resulting formulation has a refractive index in the range of about 1.55 up to about 2.0, and the resulting formulation passes the standard industrial QUV test for at least 500 hours without a significant increase in its yellow index value.

2. The formulation of claim 1 having a yellow index value, B*, of <1.

3. The formulation of claim 1 wherein said formulation is in film form and has a thickness in the range of about 1 μm up to about 1000 μm.

4. The formulation of claim 1 wherein said formulation is at least 97% transparent.

5. The formulation of claim 1 wherein said nanoparticles have an average particle size of less than 40 nm.

6. The formulation of claim 1 wherein said nanoparticles are stabilized by the presence of one or more capping agents.

7. The formulation of claim 6 wherein said capping agent is a member selected from the group consisting of polyvinyl alcohol, poly(N-vinyl-2-pyrrolidone), gum arabic, α-methacrylic acid, 11-mercaptoundecanoic acid or the disulfide derivative thereof, citric acid, trisodium citrate, stearic acid, palmitic acid, octanoic acid, decanoic acid, polyethylene glycol and derivatives thereof, polyacrylic acid and amino modified polyacrylic acid, 2-mercaptoethanol, starch, as well as mixtures of any two or more thereof.

8. The formulation of claim 6 wherein the amount of capping agent falls in the range of about 1 up to about 40 weight percent of the composition.

9. The formulation of claim 1 wherein the refractive index of said formulation falls in the range of about 1.55 up to about 2.0.

10. The formulation of claim 1 wherein the formulation comprises:

in the range of about 5 up to about 98 wt % of said light stable resin and in the range of about 2 up to about 95 wt % of said nanoparticles having high refractive index.

11. The formulation of claim 1 further comprising a member selected from the group consisting of flow additives, adhesion promoters, rheology modifiers, toughening agents, film flexibilizers, UV stabilizers, epoxy-curing catalysts, curing agents, photo-initiators, as well as mixtures of any two or more thereof.

12. An assembly comprising a first transparent component and a second transparent component separated only by an aliquot of the formulation of claim 1.

13. The assembly of claim 12 wherein the aliquot when applied to said first and/or second transparent component has a thickness of about 1 μm up to about 1000 μm.

14. An article comprising a first transparent component and a second transparent component adhered thereto with a cured aliquot of the formulation of claim 1.

15. A light emitting element wherein at least a light transmitting portion thereof is adhered thereto with a cured aliquot of the formulation of claim 1.

* * * * *